United States Patent [19]
Singer et al.

[11] Patent Number: 5,953,234
[45] Date of Patent: Sep. 14, 1999

[54] AUTOMATED STORAGE FACILITY INCLUDING A STORAGE AND RETRIEVAL SYSTEM AND A FLOOR INVENTORY MANAGEMENT SYSTEM

[75] Inventors: Chester H. Singer, Lititz; Dennis R. Schmehl, Lancaster; Richard J. Troy, Millersville, all of Pa.

[73] Assignee: Woodson Incorporated, Lititz, Pa.

[21] Appl. No.: 08/814,886

[22] Filed: Mar. 12, 1997

Related U.S. Application Data

[60] Provisional application No. 60/013,271, Mar. 12, 1996, provisional application No. 60/022,410, Jul. 30, 1996, and provisional application No. 60/022,413, Jul. 30, 1996.

[51] Int. Cl.[6] .......................... G06F 17/00; B65G 57/00
[52] U.S. Cl. ............................ 364/478.02; 364/478.05; 364/478.18; 414/789.6; 414/790.9
[58] Field of Search .................... 364/478.02, 478.03, 364/478.05, 478.18; 414/791.6, 789.6, 790.9, 791, 791.1; 705/22

[56] References Cited

U.S. PATENT DOCUMENTS

| | | | |
|---|---|---|---|
| 2,459,524 | 1/1949 | Hanson | 214/38 |
| 3,700,128 | 10/1972 | Noble et al. | 214/40 |
| 3,800,963 | 4/1974 | Holland | 214/16.4 A |
| 3,850,317 | 11/1974 | Lumier | 214/16.4 R |
| 3,921,828 | 11/1975 | Suizu | 214/16.4 C |
| 4,549,841 | 10/1985 | Ishige | 414/282 |
| 4,669,047 | 5/1987 | Chucta | 364/468 |
| 4,814,742 | 3/1989 | Morita et al. | 340/825.54 |
| 4,856,956 | 8/1989 | Zur | 414/280 |
| 5,106,259 | 4/1992 | Anderson et al. | 414/786 |
| 5,199,840 | 4/1993 | Castaldi et al. | 414/280 |
| 5,379,229 | 1/1995 | Parsons et al. | 364/478 |
| 5,411,151 | 5/1995 | Sasada | 209/583 |
| 5,472,309 | 12/1995 | Bernard, II et al. | 414/786 |
| 5,557,528 | 9/1996 | Munro et al. | 364/478.02 |
| 5,564,890 | 10/1996 | Knudsen, Jr. | 414/786 |
| 5,582,497 | 12/1996 | Noguchi | 414/281 |
| 5,636,966 | 6/1997 | Lyon et al. | 414/791.6 |

Primary Examiner—Paul P. Gordon
Attorney, Agent, or Firm—James Creighton Wray; Meera P. Narasimhan

[57] ABSTRACT

An automated storage facility includes a storage and retrieval system and a floor inventory management system. The storage and retrieval system uniquely palletizes bossies and stores palletized bossies and palletized stacks of cases together in the same storage and retrieval system. The system provides order picking of stacked cases for movement out of the storage retrieval system into an accumulator, and retrieving bossie carts from the storage and retrieval system while concurrently receiving and storing new pallets of stacked cases and new pallets with loaded bossies. It provides acceptance of loaded bossie cart-bearing pallets and discharging of loaded bossie cart pallets at one level while storing the pallets with the bossie carts throughout the storage system. Pallets with stacks of cases are delivered to order pick lanes for picking stacks from the pallets, while case stacks on conveyors are accumulated on pallets and accepted for storage on another level. The pallets with stacks of cases concurrently move throughout the storage system. A pallet is also provided, which handles stacked cases and bossie carts, as is a unique method and apparatus for loading and unloading the bossie carts on and off the pallets. The invention is a novel system for storing and retrieving products assembled and organized in different carriers. The inventory management system includes a server, client personal computers, client RF (radio-frequency) terminals, and various other peripherals, all running inventory management software.

41 Claims, 10 Drawing Sheets

AUTOMATED STORAGE FACILITY INCLUDING A STORAGE AND RETRIEVAL SYSTEM AND A FLOOR INVENTORY MANAGEMENT SYSTEM

This application claims the benefit of U.S. Provisional Application Ser. No. 60/013,271, filed Mar. 12, 1996, U.S. Provisional Application Ser. No. 60/022,410, filed Jul. 30, 1996, and U.S. Provisional Application Ser. No. 60/022,413, filed Jul. 30, 1996.

BACKGROUND OF THE INVENTION

The present invention relates to facilities and systems for handling products.

Storage retrieval systems are used primarily as short term buffer systems for storing products made in continuous or periodic production according to product life and demands and production line efficiencies. Shipping occurs on a regular periodic basis according to consolidated product orders. For example, milk may be continuously pasteurized, made into separate products and packaged in three shifts of operations. Liquid products associated with the dairy industry may be formulated, constituted and packaged on a regular periodic basis. Many different products in different package configurations may be generated and shipped, including gallons and half gallons in plastic containers with screw tops and handles, and half gallons, quarts, pints and half pints in specially formed, treated and coated paperboard containers. Usually the paperboard containers are filled, sealed, date stamped and placed in cases which are then stacked six high and moved along powered and free roller conveyors to temporary storage and shipment. The large plastic gallon containers, and sometimes the half gallon plastic containers, are placed on shelves on wheeled carts, which are known as bossie carts, and the bossie carts are moved into temporary storage on their way to shipping stations. The temporary storage and movement problems are compounded by the product mix. For example, whole milk, Vitamin D milk, 2% milk, skim milk, half and half, and cream, plus a variety of juices and drinks.

The problem is further compounded by the need to assure first in, first out movements and to provide a batch hold capability in the storage.

The problem is further intensified by the regular periodic shipping requirements and specific order response requirements.

While a production plant may operate continuously on a three-shift basis, shipping may operate on only a one- or two-shift basis. When shipping, it may be necessary to fill ten or more trailer loads per hour. A complexity is added to the problem by mandating a system which is capable of handling, temporarily storing and retrieving high volumes of stacked cases and high volumes of packed bossie carts.

Managing product inventory in production plants is difficult as mass quantities of product are continuously placed in and picked from storage areas. Arranging the products for efficient first in, first out picking is a necessity. Immediate verification of actual quantities of product in stock and the location of that product is a requirement on both the production and distribution ends. Needs exist for inventory systems that account for each product present in the facility at all times, that track the location of each product placed and picked during plant operation, and that provide for facilitated storage, identification and retrieval of desired product.

SUMMARY OF THE INVENTION

The present invention is an automated storage facility that includes a storage and retrieval system and a floor inventory management system.

The present invention provides a unique storage and retrieval system, which uniquely palletizes bossies and stores palletized bossies and palletized stacks of cases together in the same storage and retrieval system. The system uniquely provides order picking of stacked cases for movement out of the storage retrieval system into an accumulator, and retrieving bossie carts from the storage and retrieval system while concurrently receiving and storing new pallets of stacked cases and new pallets with loaded bossies.

The present invention provides the acceptance of loaded bossie cart-bearing pallets and the discharging of loaded bossie cart pallets at one level while storing the pallets with the bossie carts throughout the storage system. Pallets with stacks of cases are delivered to order pick lanes for picking stacks from the pallets, while case stacks on conveyors are accumulated on pallets and accepted for storage on another level. The pallets with stacks of cases concurrently move throughout the storage system.

The invention provides a unique pallet which handles both stacked cases and bossie carts, and a unique method and apparatus for loading and unloading the bossie carts on and off the pallets. The invention also provides a novel system for storing and retrieving products assembled and organized in different carriers.

The inventory management system of the present facility includes a Hewlett-Packard Unix-based server, client personal computers, client RF (radio-frequency) terminals, and various other peripherals, all running inventory management software. This software performs the following tasks:

Permits production data entry at the fillers, using local industrial terminals to tell the system the product code and expiration date being run on each filler.

Uses a PLC (programmable logic controller) connected to photocells to determine the actual case count of each product coming off of each filler.

Uses real-time handheld RF data terminals to learn from the pullers the actual locations where the stacks have been stored. These terminals are also used when storing received product in the pallet racks.

Manages a file-based Ethernet TCP/IP interface to a host computer (supplied by Owner), receiving orders and transmitting shipments and inventory balances.

Permits order entry, scheduling, and maintenance.

Uses real-time handheld RF data terminals to direct order pickers and to update inventory as orders are picked. This includes inventory on the floor, in the pallet racks, and in the bossie makeup area. Bossies are wheeled racks in which product is placed.

Performs all additional transactions necessary to manage inventory in the highrise.

These and further and other objects and features of the invention are apparent in the disclosure, which includes the above and ongoing written specification, with the claims and drawings.

DETAILED DESCRIPTION OF THE PREFERRED EMBODIMENTS

Figure 1:
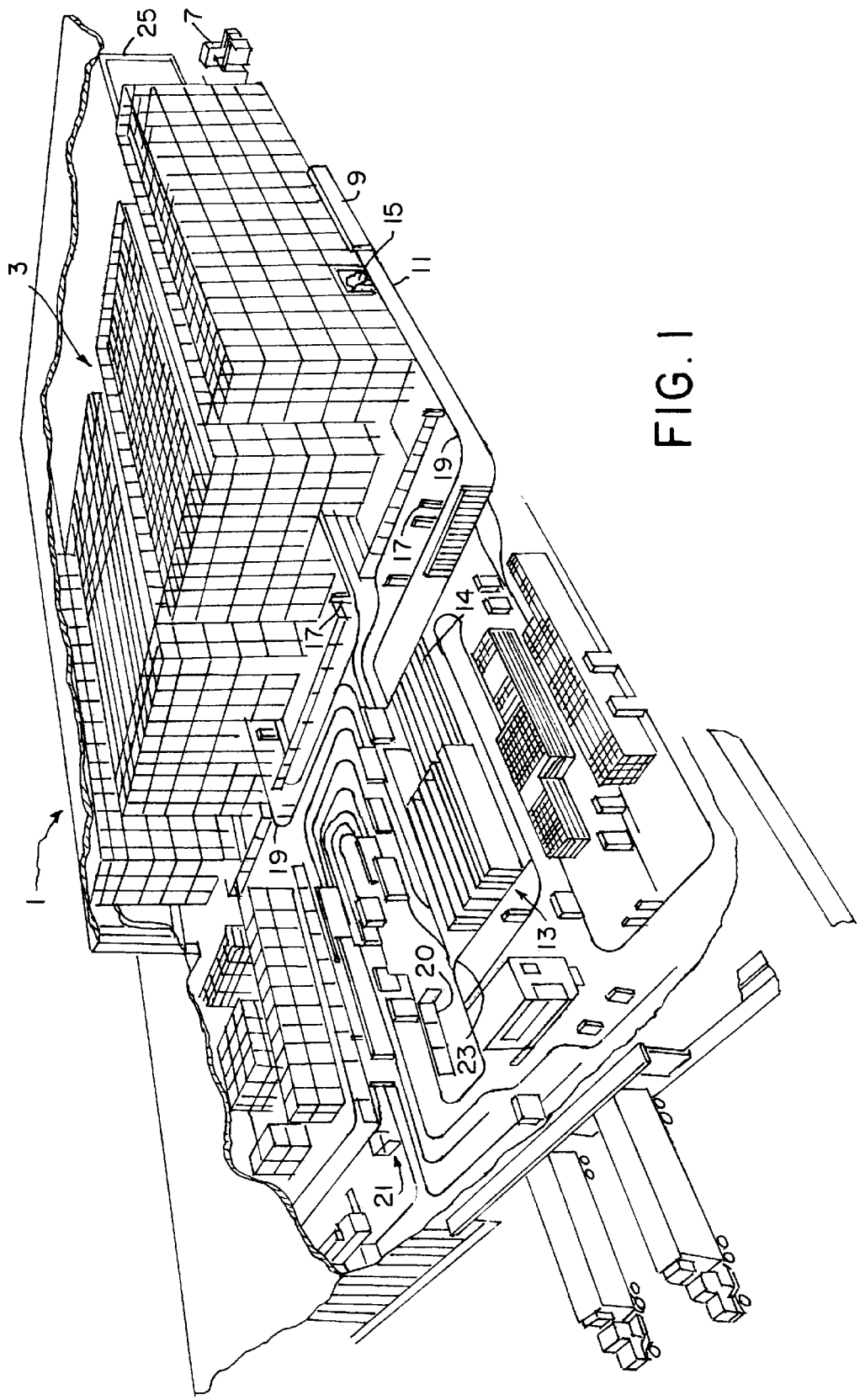
FIG. 1 is a perspective view of an automated storage system.

Referring to FIG. 1, a high rise storage facility 1 has three aisles 3 served by stacker/retriever (S/R) cranes which move along fixed top and bottom rails in the aisles. An elevator moves vertically along a mast, and the mast moves horizontally along the rails. Cars or rack entry vehicles mounted on the elevators move into and out of the racks, depositing loaded pallets in the racks and withdrawing loaded pallets, all as controlled by a computer.

Each pallet contains a number of stacks of product cases, for example eight stacks of six cases per stack. As shown in FIG. 1, the stacks are pushed from the pallets by an unloader 7, and groups 9 of sixteen stacks move along tracks 11 to a high flow product area 13. Stacks are pushed from the conveyor 11 to rows 14 in the high flow product storage area 13.

Individual stacks of cases are manually pulled or picked 15 from the lowermost storage racks or order pick lanes in the rack storage areas.

The individual stacks 17 move along tracks 19 to single truckload-forming conveyors 20 in a truckload accumulation area 21. Individual stacks are gated from the high flow product storage area 13 and flow along conveyors 23 to the truck conveyors 20 in the truckload makeup area 21.

Figure 2:
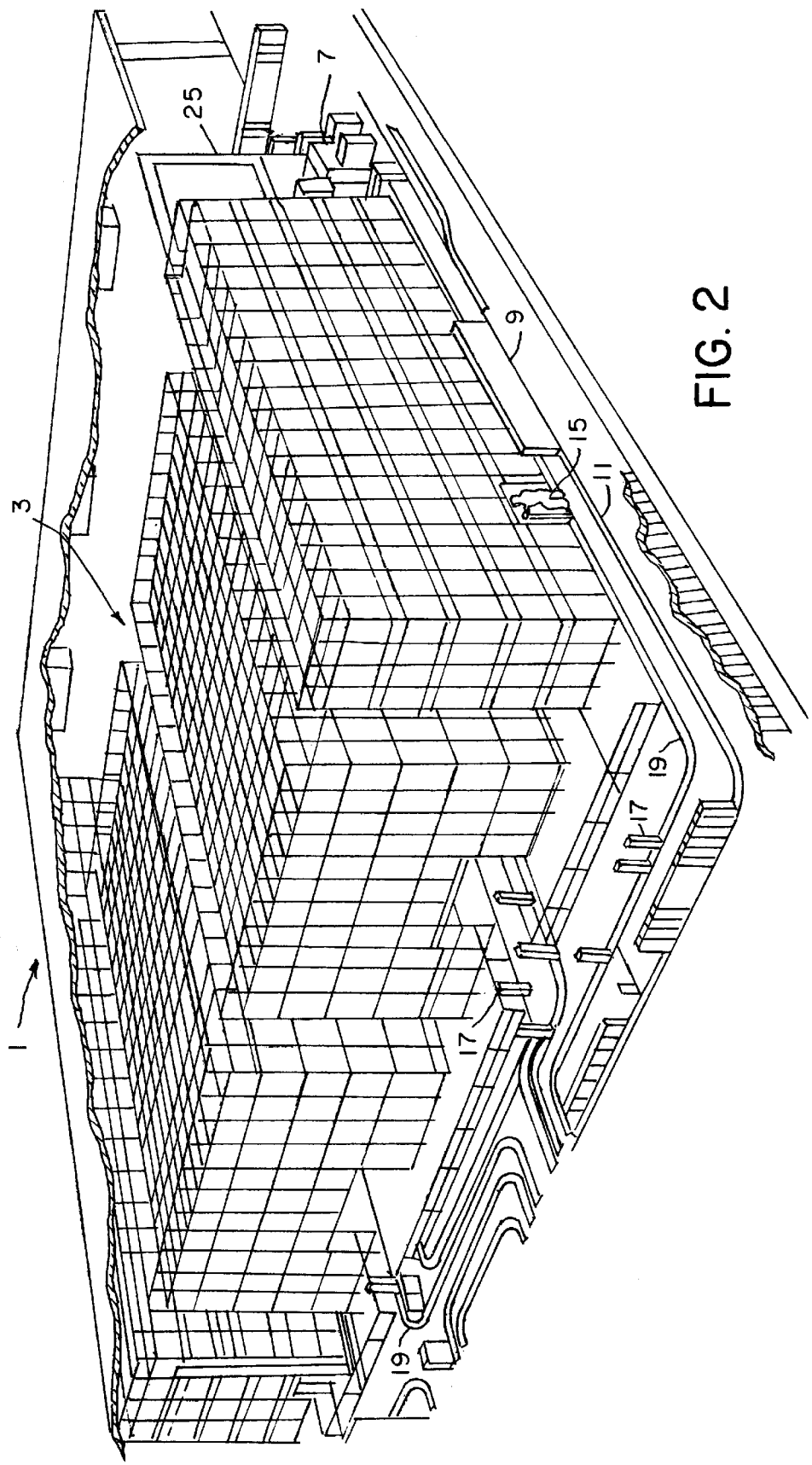
FIG. 2 is an enlarged view of an automated storage system.

FIG. 2 is an enlarged detail of the rack storage area showing a stacker/retriever crane 25 which is movable along one of the aisles 3. Individual stacks of cases are moved onto the individual stack conveyors 19, which extend into and along the lowermost lanes, which are order pick lanes in the storage racks.

Figure 3:
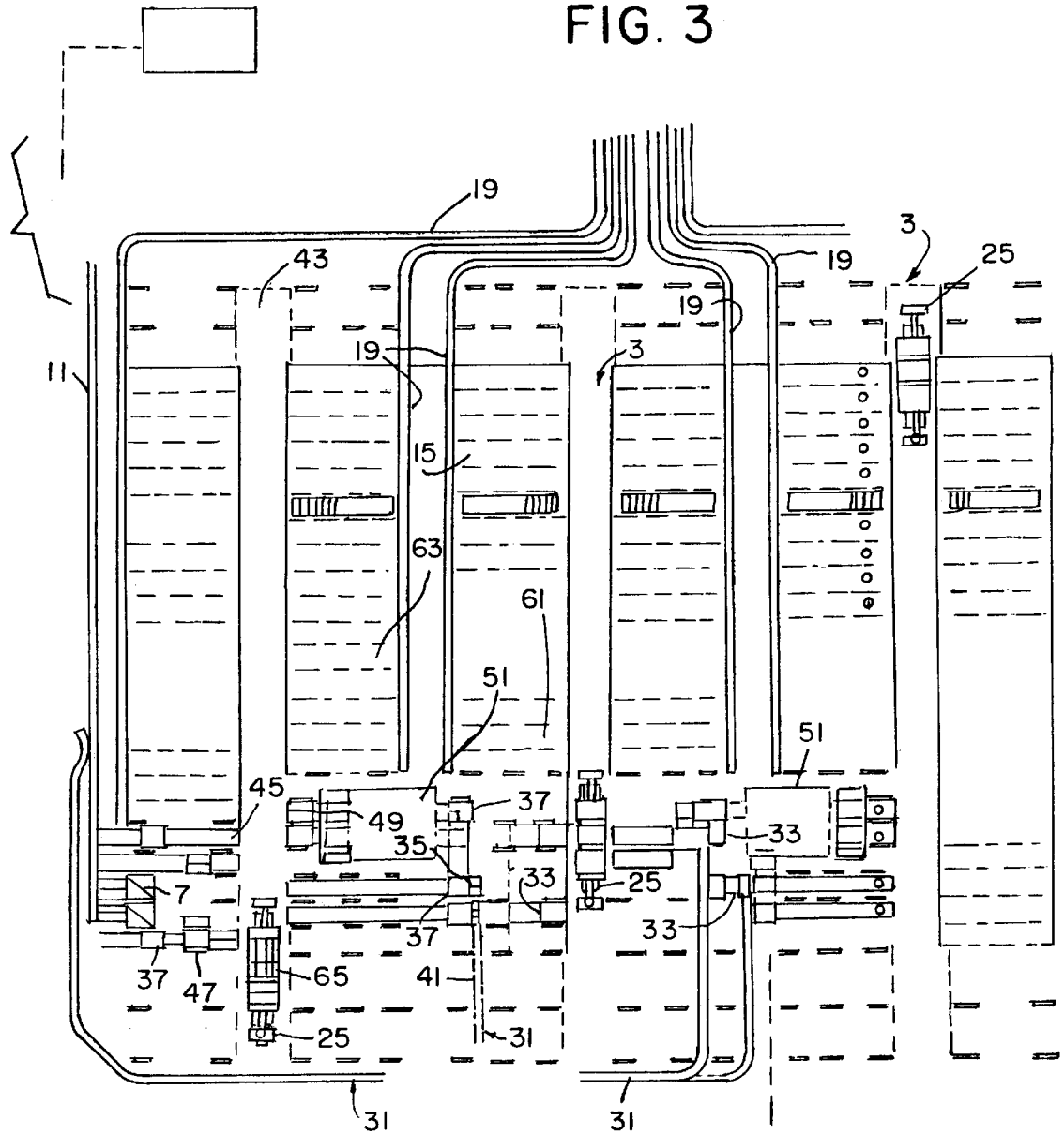
FIG. 3 is a plan view of the warehousing portion of the automated stacker system.

As shown in FIG. 3, product flow moves in the direction of arrow 30. Loaded and empty pallets move on the first or ground level in the lanes under the influence of gravity in the directions shown by the small arrows.

The stacker/retrievers 25 move within aisles 3. Product flows into the storage rack system on conveyors 31 in cases stacked six high and in groups of sixteen stacks. Pallet loaders 33 push pairs of cases 35 onto pallets 37. When the pallets are full, the pallets are released, and the full pallets move by gravity along pallet infeed lanes 39. Stacks of product which has the highest flow-through are delivered from the production plant on conveyor 41, and those high flow product-loaded pallets are stored in the racks along aisle 43 by the stacker/retriever 25 in that aisle. As the conveyors 14 in the high flow product storage area 13 need stacks of cases, a computer directs the stacker/retriever 25 operating in aisle 43 to pick up two pallets and deliver the pallets to the parallel outfeed lanes 45. The loaded pallets flow by gravity to the bottom of the outfeed lanes, and then to a position in front of the pallet unloaders 7. The pallet unloaders 7 push stacks from the pallets two at a time, grouping all sixteen stacks of cases from two pallets to move along the floor conveyor 11 to the high flow product storage area 13 shown in FIG. 1. The empty pallets are delivered to empty pallet lanes 47, where the empty pallets are stacked and readied for delivery to the receiving platform 49 of the pallet washer 51. The washed pallets 37 are then redelivered to the pallet loaders 33 for receiving stacks of cases.

FIG. 3 shows the first level or ground level in which all of the stackers 25 serve the racks along the aisles. The stackers continually load the racks during production period, and keep the order pick lanes 61 at the floor level full of pallets loaded with stacked product cases. Order picking of individual stacks of cases 15 occurs along each order picking outfeed conveyor 19, which send individual stacks of cases to the truckload assembly area 21. Pallets from which all stacks have been picked are removed from the order pick lanes and placed on the closest pallet return lane 63 where the pallets are stacked and then released to flow by gravity down the empty pallet return lane 63. The stacked empty pallets are picked up by the cars 65 on the stacker/retrievers 25 for return to the empty pallet receivers 49 of the pallet washers 51.

All of the infeed conveyors 31 are loaded with sixteen stacks of six loaded cases each. Each of the infeed conveyors 31 supplies the stacked cases in groups of sixteen stacks to the individual pallet loaders 33. Pallets in the paired full pallet lanes 39 are loaded with identical products of the same SKU numbers.

Throughout the storage racks the products with the identical SKU numbers are stored in side-by-side racks so that the rack entry vehicles 65 on the stacker/retriever cranes 25 may currently deliver and pick up paired pallets in paired lanes which are loaded with identical products.

The automated unloaders 7 always unload identical products in groups of sixteen stacks which move along conveyor 11 to the high flow product storage area 13 shown in FIG. 1. The order pick lanes 61 are paired with identical products in two adjacent order pick lanes.

The operation of the facility includes the following processes:

1. Accumulate a batch of material.

Batches of the material are accumulated and released onto the conveyor which leads to the palletizer. The step includes accumulating a batch of material and determining if the batch constitutes two full pallets of product. If the batch does constitute two full pallets of product, the batch is released to the conveyor. If the batch does not constitute two full pallets of product, the operation includes waiting for manual batch release (end of run) and releasing the partial batch to the conveyor.

2. Palletize a batch of material.

The palletizer creates a pair of pallets from a batch and releases them to a storage/retrieval machine (S/R machine). The step includes receiving a batch from the conveyor, palletizing one pallet, releasing the pallet to the S/R machine, and pointing the palletizer to the other infeed conveyor. If the batch includes a second pallet, the operation further includes palletizing the second pallet, releasing the second pallet to the S/R machine, and pointing the palletizer to the other infeed conveyor.

3. Store a pair of pallets.

An S/R machine picks up a pair of pallets and deposits them in storage, or directly to an outfeed lane if possible. The step includes picking up a pair of like pallets simultaneously at adjacent infeed addresses and operating according to the following logic:

Are the pallets suitable for delivery directly to outfeed lanes?
If yes
   Can the pallets be delivered directly to the depalletizer?
   If yes
      Deposit the pallets simultaneously at the adjacent pair of depalletizer outfeed lanes.
      Stop.
   Endif
   Can the pallets be delivered directly to a pair of adjacent outfeed lanes which are assigned to the product?
   If yes
      Deposit the pallets simultaneously at the adjacent pair of outfeed lanes.
      Stop.
   Endif
   Can the pallets be delivered directly to a single outfeed lane which is assigned to the product and has room for both pallets?
   If yes
      Deposit the pallets consecutively at the outfeed lane.
      Stop.
   Endif
   Can the pallets be delivered directly to a pair of adjacent outfeed lanes to satisfy a particular order which specifies that product?
   If yes
      Deposit the pallets simultaneously at the adjacent pair of outfeed lanes.
      Stop.
   Endif
Endif
Is the material of a type which should be stored in adjacent pairs of storage lanes?
If yes
   Can the pallets be delivered to an adjacent pair of storage lanes which already contain at least one pallet of that material?
   If yes
      Deposit the pallets simultaneously at the adjacent pair of storage lanes.
      Stop.
   Endif
   Can the pallets be delivered to an adjacent pair of storage lanes which are empty?
   If yes
      Deposit the pallets simultaneously at the adjacent pair of empty storage lanes.
      Stop.
   Endif
Endif
Can the pallets be delivered to a storage lane which has room for both pallets and already contains at least one pallet of that material?
If yes
   Deposit the pallets consecutively at the storage lane.
   Stop.
Endif
Can the pallets be delivered to an empty storage lane?
If yes
   Deposit the pallets consecutively at the storage lane.
   Stop.
Endif
Can any room be found at all?
If yes
   Deposit the pallets consecutively or randomly at one or two storage lanes.
If no
   Sound an alarm.

4. Retrieve a pair of pallets to the depalletizer.

An S/R machine retrieves a pair of like pallets to replenish a pair of adjacent depalletizer outfeed lanes. The step includes determining the next kind of material required at the depalletizer and operating according to the following logic:

Can a pair of the oldest suitable kinds of pallets be found from two adjacent storage lanes?
If yes
   Pick up the pallets simultaneously at the pair of adjacent storage lanes.
   Deposit the pallets simultaneously at the pair of adjacent depalletizer outfeed lanes.
If no
   Can a pair of the oldest suitable kinds of pallets be found in a single storage lane?
   If yes
      Pick up the pallets consecutively at the storage lane.
      Deposit the pallets simultaneously at the pair of adjacent depalletizer outfeed lanes,
   If no
      Can a pair of the oldest suitable kinds of pallets be found in two separate storage lanes?
      If yes
   Pick up the first pallet at the first storage lane.
   Pick up the second pallet at the second storage lane.
   Deposit the pallets simultaneously at the pair of adjacent depalletizer outfeed lanes.
   If no
      Can one of the oldest suitable kinds of pallets be found in a single storage lane?
      If yes
         Pick up the pallet at the storage lane.
         Deposit the pallet at one of the depalletizer outfeed lanes.
      If no
         Sound an alarm.

5. Retrieve a pair of pallets to adjacent like assigned outfeed lanes.

An S/R machine retrieves a pair of like pallets to replenish a pair of adjacent order-pick outfeed lanes which are assigned to the same type of material. The step includes determining the kind of material assigned to the adjacent outfeed lanes and operating according to the following logic:

Can a pair of the oldest suitable kinds of pallets be found from two adjacent storage lanes?

If yes
  Pick up the pallets simultaneously at the pair of adjacent storage lanes.
  Deposit the pallets simultaneously at the pair of adjacent outfeed lanes.
If no
  Can a pair of the oldest suitable kinds of pallets be found in a single storage lane?
  If yes
    Pick up the pallets consecutively at the storage lane.
    Deposit the pallets simultaneously at the pair of adjacent outfeed lanes.
  If no
    Can a pair of the oldest suitable kinds of pallets be found in two separate storage lanes?
    If yes
      Pick up the first pallet at the first storage lane.
      Pick up the second pallet at the second storage lane.
      Deposit the pallets simultaneously at the pair of adjacent outfeed lanes.
    If no
      Can one of the oldest suitable kinds of pallets be found in a single storage lane?
      If yes
        Pick up the pallet at the storage lane.
        Deposit the pallet at the emptier of the pair of adjacent outfeed lanes.
      If no
        Sound an alarm.

6. Retrieve a pair of pallets to a single assigned outfeed lane.

An S/R machine retrieves a pair of like pallets to replenish a single outfeed lane which is assigned to the material. The step includes determining the kind of material assigned to the outfeed lane and operating according to the following logic: Is there at room for at least two pallets in the lane?
If yes
  Can a pair of the oldest suitable kinds of pallets be found from two Adjacent storage lanes?
  If yes
    Pick up the pallets simultaneously at the pair of adjacent storage lanes.
    Deposit the pallets consecutively at the outfeed lane.
  If no
    Can a pair of the oldest suitable kinds of pallets be found in a single storage lane?
    If yes
      Pick up the pallets consecutively at the storage lane.
      Deposit the pallets consecutively at the outfeed lane.
    If no
      Can a pair of the oldest suitable kinds of pallets be found in two separate storage lanes?
      If yes
        Pick up the first pallet at the first storage lane.
        Pick up the second pallet at the second storage lane.
        Deposit the pallets consecutively at the outfeed lane.
      If no
        Can one of the oldest suitable kinds of pallets be found in a single storage lane?
        If yes
          Pick up the pallet at the storage lane.
          Deposit the pallet at the outfeed lane.
        If no
          Sound an alarm.
If no
  Can one of the oldest suitable kinds of pallets be found in a single storage lane?
  If yes
    Pick up the pallet at the storage lane.
    Deposit the pallet at the outfeed lane.
  If no
    Sound an alarm.

7. Retrieve a pair of pallets to a pair of adjacent outfeed lanes assigned to an order.

An S/R machine retrieves a pair of pallets (like or unlike) to replenish a pair of adjacent outfood lanes which are assigned to an order. The step includes determining the emptiest pair of outfood lanes assigned to the order and operating according to the following logic:
Determine the next kind of material required to satisfy an order.
Are at least two more pallets of the material required?
If yes
  Can a pair of the oldest suitable kinds of pallets be found from two adjacent storage lanes?
  If yes
    Pick up the pallets simultaneously at the pair of adjacent storage lanes.
    Deposit the pallets simultaneously at the pair of adjacent outfeed lanes.
  If no
    Can a pair of the oldest suitable kinds of pallets be found in a single storage lane?
    If yes
      Pick up the pallets consecutively at the storage lane.
      Deposit the pallets simultaneously at the pair of adjacent outfeed lanes.
    If no
      Can a pair of the oldest suitable kinds of pallets be found in two separate storage lanes?
      If yes
        Pick up the first pallet at the first storage lane.
        Pick up the second pallet at the second storage lane.
        Deposit the pallets simultaneously at the pair of adjacent outfeed lanes.
      If no
        Sound an alarm.
If no
  Can a pallet of the next required material be found in a storage lane?
  If yes
    Pick up the pallet at the storage lane.
    Is another pallet required for the order?
    If yes
      Can a pallet of the next required material be found in a storage lane?
      If yes
        Pick up the pallet at the storage lane.
        Deposit the pallets simultaneously at the pair of adjacent outfeed lanes.
      If no
        Deposit the first pallet at the emptier of the pair of adjacent outfeed lanes.
        Sound an alarm.
    If no
      Deposit the first pallet at the emptier of the pair of adjacent outfeed lanes.
  If no
    Sound an alarm.

8. Recycle empty pallet stacks.

An S/R machine picks up a pair of empty pallet stacks from a single return lane or from a pair of return lanes, and delivers them to either a pallet washer or a palletizer. The step proceeds as follows:

Is it permitted for two stacks be picked up from a single return lane?

If yes

Find the fullest return lane.

Can one be found with at least two pallets in it?

If yes

Pick up two pallets consecutively at the return lane.

Deposit both pallets simultaneously at the pallet washer or palletizer.

Find the fullest return lane.

Can one be found?

If yes

Pick up a pallet at the return lane.

Find the next fullest return lane.

Can one be found?

If yes

Pick up a pallet at the return lane.

Deposit both pallets simultaneously at the pallet washer or palletizer.

If no

Deposit the first pallet at the emptiest pallet washer or palletizer.

If no

Exit.

Figure 4:
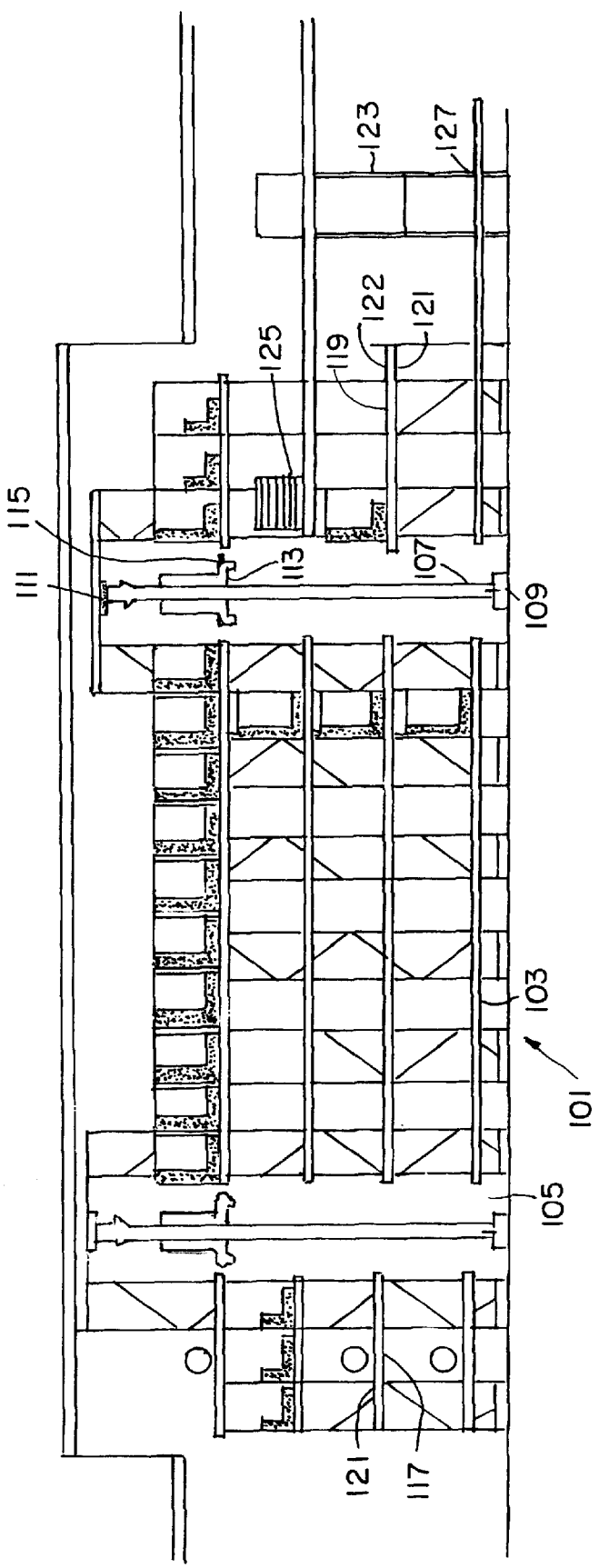
FIG. 4 is an end elevation schematically showing the storage retrieval system of the present invention, showing four storage levels, and order picking lanes on the second level.

Referring to FIG. 4, an automated storage and retrieval system is generally indicated by the numeral 101. The system has four levels of storage rails 3 with two longitudinal aisles 105. Vertical masts 107 of stacker retriever machines ride on rails 109 and 111. A carriage 113 is driven up and down the masts 107. Rack entry vehicle 115 mounted on the carriage is capable of moving left or right into and out of the storage racks to store and retrieve loaded pallets.

The outer lanes 117 on the second level are inclined to slide the pallets downward and outward into the outermost order picking positions 119, in which individual stacks of cases are slid from the pallets onto order picking conveyors 121 by an order picker standing on grating 122. Order picking lanes 117 are kept substantially fully by transfer of pallets loaded with stacked cases from the storage racks or directly from the pallet loaders.

The rack vehicles 115 are supported on lateral rollers which move in C-shaped rails in the rack. Platforms on the vehicles lift and lower the pallets. The loaded pallets on the top level show that each rack vehicle is capable of carrying, storing and retrieving five loaded pallets inboard in the racks and three outward. The small numbers represent loaded pallets; the circled numbers identify levels.

At the right of FIG. 4 is a lowerator 123 for lowering stacks 125 of empty pallets into positions 127 for loading the pallets with filled bossie carts. The cart-loaded pallets are then moved to the bossie cart pallet input lanes for carriage by the masts 107, elevator carriage 113 and rack entry vehicle 115 to any desired storage position in the rack. The storage positions are dictated by a computer control.

Figure 5:
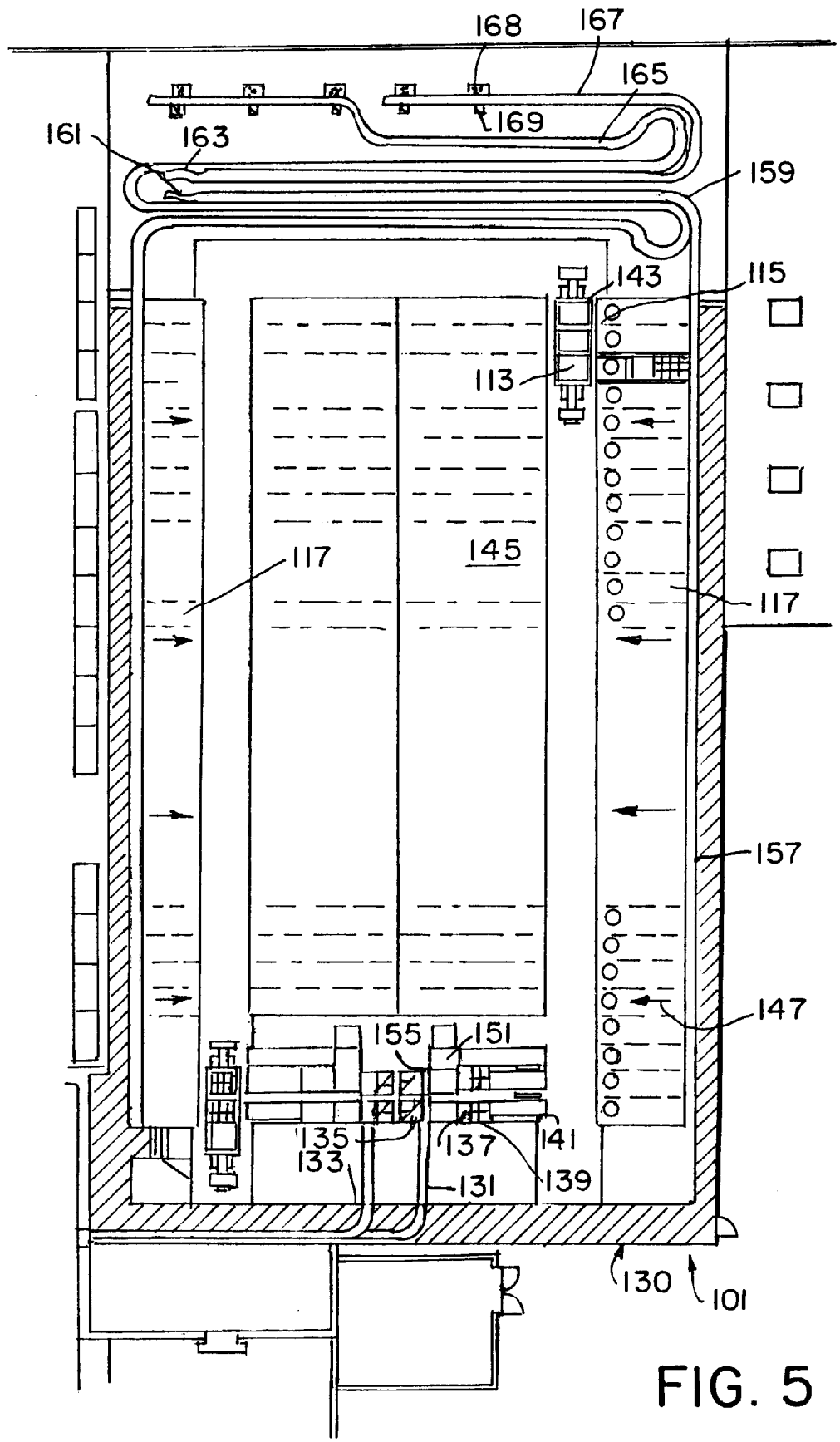
FIG. 5 is a plan view schematically showing the second level with storage lanes and order picking lanes, empty pallet return lanes, infeed conveyors and stack pushers for filling pallets, picked stack conveyors, accumulators and lowerators.

FIG. 5 shows a second level 130 of the storage retrieval system 101, showing thirty numbered lanes. Product in stacks of six cases enters the system on powered roller conveyors 131. Gates 133 admit the stacks in groups of three. Pushers 135 push the stacks in groups of three onto pallets 137 until each pallet is filled with twelve stacks of cases. Full pallets are released to move by gravity along the full pallet lanes 139 to pick up positions 141 at the ends of the parallel lanes 139. The loaded pallets 143 are picked up by the rack entry vehicles 115 which move in parallel on the carriage 113, and are carried to any storage location in the entire storage rack on any level, or directly to the order pick lanes 117 on the outside of level 2. When pallets in the extreme outer positions in the gravity outward flow order pick lanes 117 are exhausted, the pallets are moved and stacked on any one of the pallet return lanes indicated by the inward pointing arrows 147. The pallets are stacked in the outermost positions on the pallet return lanes, and stacks of pallets are released for gravity flow inward to innermost positions, where they are picked up by the rack entry vehicles 115 on the carriage 113 and returned to the empty pallet input lane 149. The stacks of empty pallets flow by gravity inward to a position 151, where the lowermost pallets in the stack are pushed by pushers 153 into the pallet loading positions 155.

Stacks of cases are pulled from pallets in the ends 119 of the order picking lanes 117 onto the order picking conveyors 121, 157, which carry the stacks forward into the accumulators 159. The stacks are controlled by gates 161 and directed by gates 163 onto the appropriate conveyors 165 and 167, where the stacks are stopped in front of the lowerators 168 and pushed onto the lowerators with the pushers 169 at the appropriate time for loading a truck.

Figure 6:
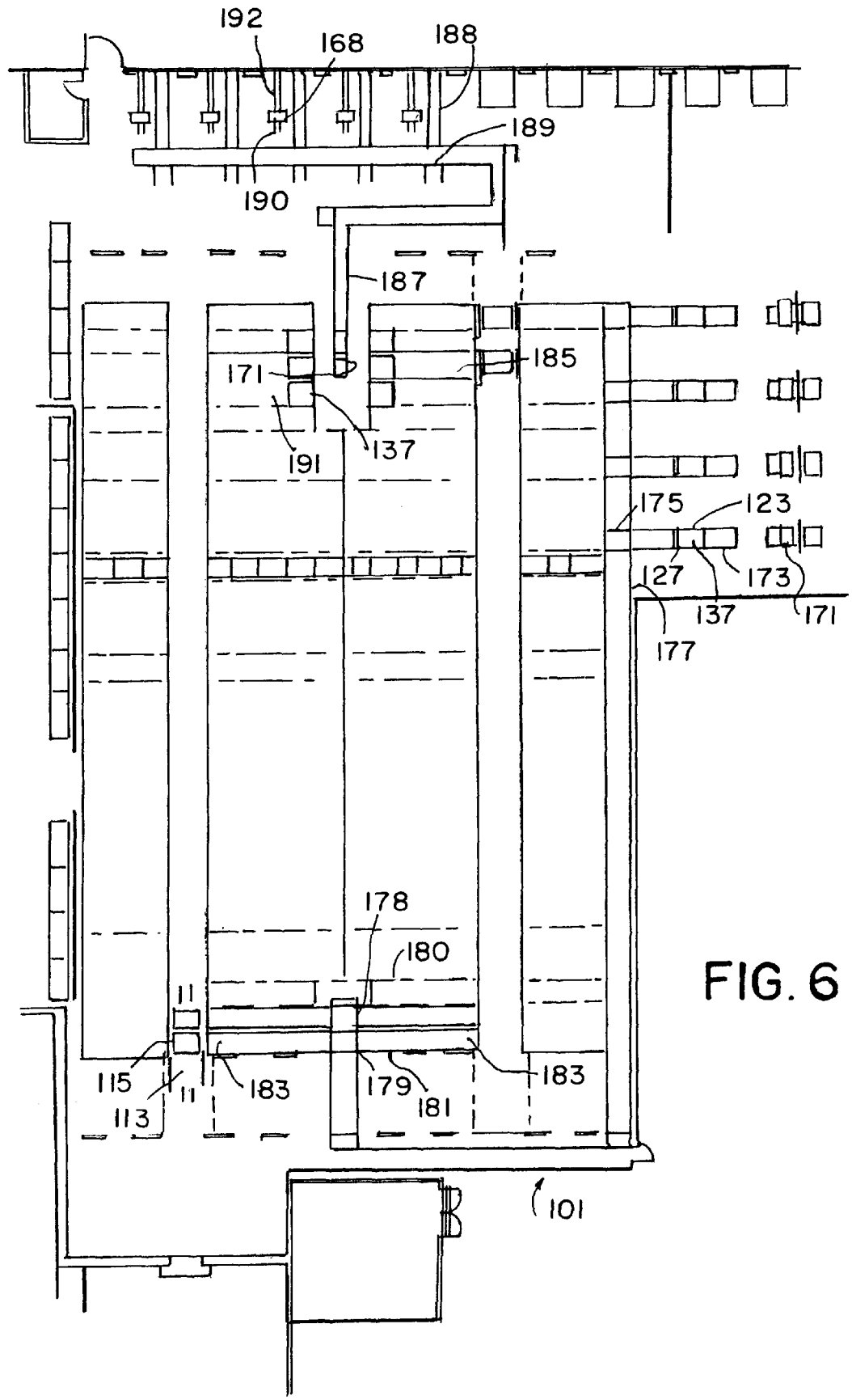
FIG. 6 shows a first level with storage lanes and bossie cart pallet loaders and unloaders, bossie cart conveyors and pushers, and stack lowerators and pushers for loading trucks.

FIG. 6 shows the first level 170. Empty pallets 137 are lowered into the bossie cart-pallet loading positions 127 by lowerators 123. Bossies 171 are pushed in pairs 173 onto the empty pallets 137, and the bossie cart-laden pallets are released to move under gravity to positions 175 on pallet conveyor 177. The pallet conveyor then carries the bossie-laden pallet to the bossie cart pallet infeed lane positions 178 and 179. The pallets are then selectively urged onto the gravitational infeed lanes 180 and 181 on the appropriate side, preferably by alternating the movement of the bossie-laden pallets from one side to the other. The pallets then move by gravity to positions 183, where they are picked up by rack entry vehicles 115 on carriages 113. Two bossie cart-laden pallets are carried to any storage location in the entire rack system.

At the appropriate time the bossie cart-laden pallets are retrieved and are carried to the parallel outflow lanes 185, which gravitationally feed inward. The bossie carts are elevated and released from the pallets. Individual bossie carts 171 are pulled onto the indexing bossie conveyor 187, which carries the bossie carts to positions in front of the pushers 189. The bossie carts are pushed along paths 188 to load the trucks.

Lowerators 168 position the stacks of cases which have been lowered from the second level in front of pushers 190. The stacks of cases are pushed along lines 192 into the trucks. The empty pallets 137 are stacked by a pallet stacker on the empty pallet lanes 191. When a stack of empty pallets is complete, it is released for flow outward to a position to be picked up by the rack entry vehicle. The carriage makes two stops to fill each vehicle 115 with a stack of empty racks.

Figure 7:
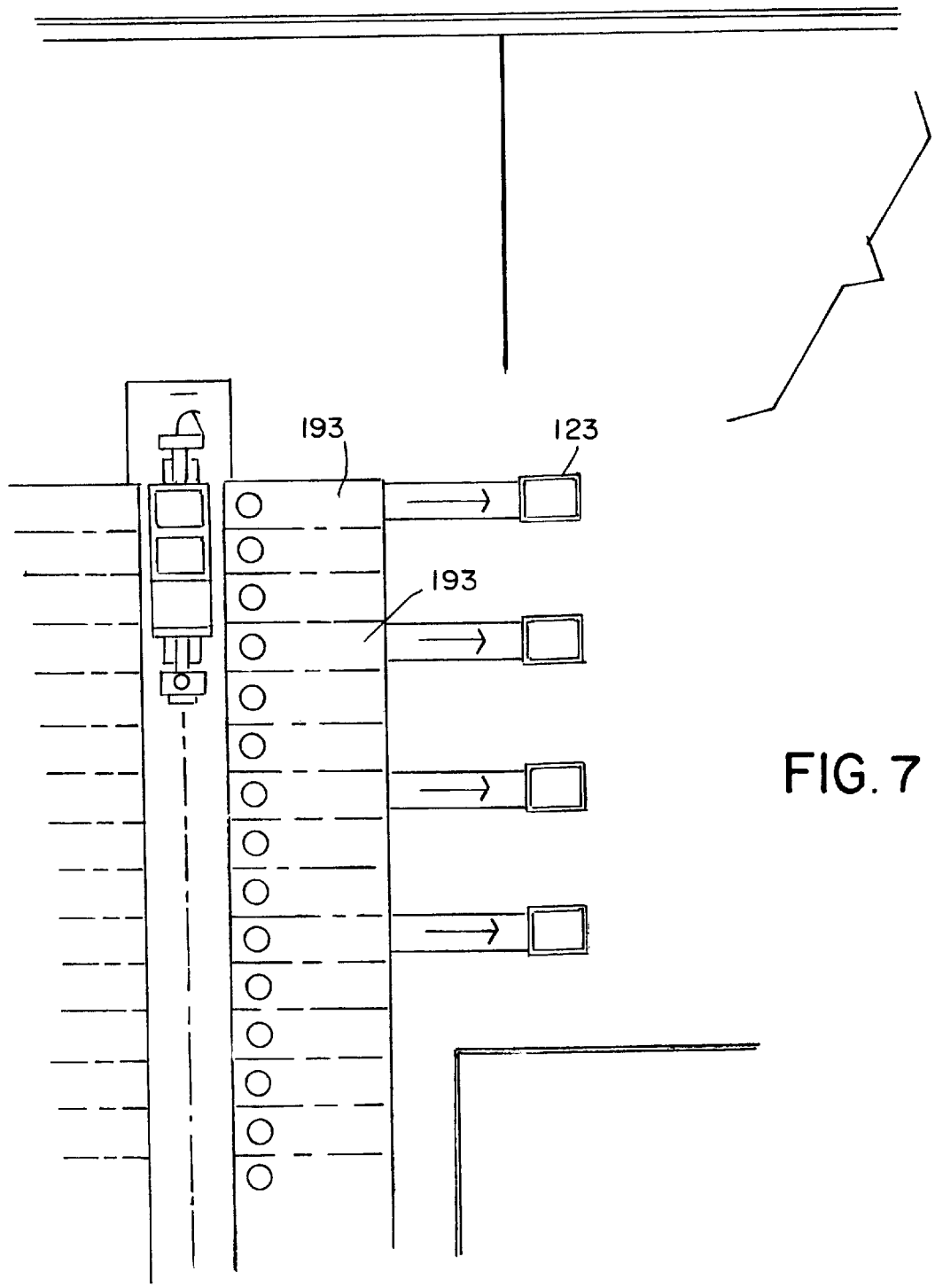
FIG. 7 schematically shows a partial third level with empty pallet returns to lowerators for lowering the pallets to bossie cart pallet loading stations.
Figure 8:
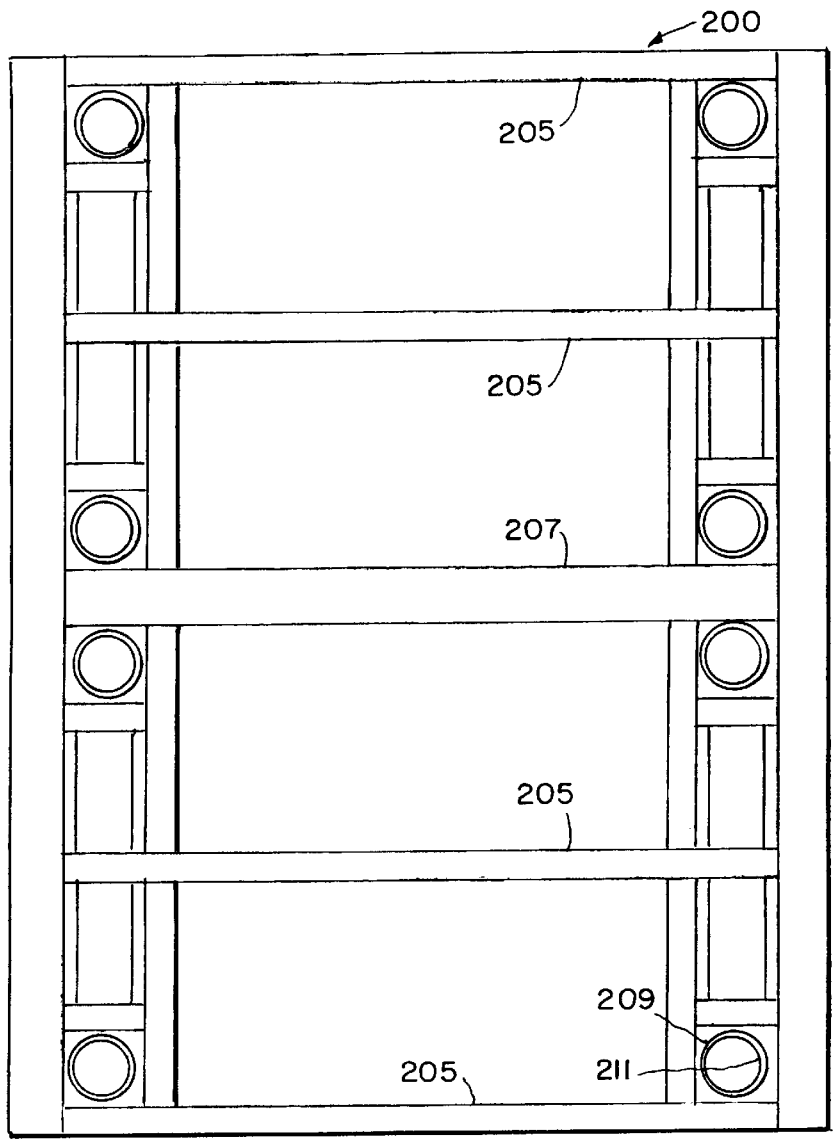
FIG. 8 is a schematic plan view of the new pallets.

Stacks of empty pallets are carried to the empty pallet movement lanes 193, shown in FIG. 7, on the third level for gravitational movement to the tops of the lowerators 123. The bottommost pallet is lowered into the pallet loading position 127 shown in FIG. 4.

FIGS. 8–12 are plan and cross-sectional views of the new pallet.

The new pallet is generally indicated by the numeral 200. Pallet 200 has a thick aluminum surface plate 201, elongated aluminum side tubes 203 which have a large rectangular cross-section, and cross tubes 205 which have a square cross-section. A central cross tube 207 has a rectangular cross-section similar to the cross-section of the side tubes 203. Wheel holes 209 have indented lips 211 for receiving the caster wheels 213 of bossie carts. Square cross-section support tubes 215 extend between the cross tubes along the openings 209. Short, square support tubes 217 extend along the wheel openings between the support tubes 215 and the side tubes 203. Rectangular support tubes 219 extend between the short, square support tubes 217 and the cross tubes 205. All of the tube intersections are welded. Two runners 221 extend under the side tubes 203. The tubes are heavy ¼" thick aluminum square and rectangular tubes. The runners are ⅛" thick aluminum sheet, and the top is 0.090" thick aluminum sheet.

Figure 9:
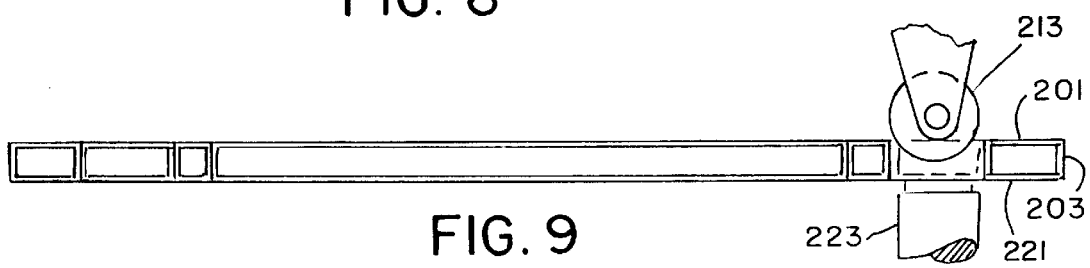
FIG. 9 is an end elevational cross-section along line 1 of the pallet showing cart caster positioning in the pallet, and cart wheel lowering and raising pins for lifting and lowering the caster wheels of the bossie carts. Similar pins are used at bossie cart loading and unloading stations.
Figure 10:
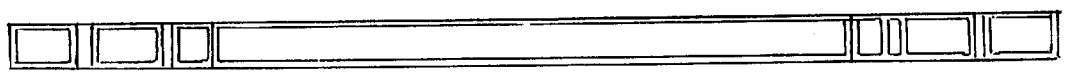
FIG. 10 is a cross-section along section line 2 showing structural details in end view.
Figure 11:
FIGS. 11 and 12 are cross-sectional side views of the new pallet taken along sections lines 3 and 4, respectively.
Figure 12:

As shown in FIG. 9, a ram 223 lifts the wheel 213 so that the bossie cart may be rolled off the top surface 201. The pallet is raised and lowered so that the top surface 201 is even with ground or conveyor level when rolling the bossies on and off the pallet.

The present automated facility preferably includes a computer-driven floor inventory management system. The inventory system preferably includes the following hardware:

| Qty | Description |
| --- | --- |
| Server hardware: | |
| 1 | Hewlett-Packard model D200 computer, containing: |
|   | 75 MHZ PA-RISC processor |
|   | 256 KB cache |
|   | 64 MB ECC memory |
|   | Dual 2.0 GB hard disk drives (mirrored) |
|   | CD-ROM drive |
|   | 2.0 GB 4mm backup tape drive |
|   | 16 RS-232 serial ports |
|   | Ethernet connection |
|   | Console terminal |
| Server software: | |
| 1 | 32-user HP-UX operating system license |
| 1 | MirrrorDisk-UX disk mirroring software |
| 1 | C compiler |
| Progress Corporation Database/4GL software: | |
| 32 | Workgroup Server license |
| 5 | Client PC networking license |
| 1 | ProVision Application Development System (for Windows) |
| 1 | 4GL Application Development System (for HP-UX) |
| 1 | Report Builder license |
| 1 | Report Server license |
| Client PCs: | |
| 3 | Client PCS, each containing: |
|   | Pentium processor |
|   | 8 MB RAM |
|   | 500 MB disk drive |
|   | Ethernet connection |
|   | 17" monitor |
|   | Windows 95 |
| Radio data network: | |
| 3 | Norand model RB4030E base radio transceiver with Ethernet link |
| 6 | Norand model RT1740 radio data terminal |
| 6 | Integrated barcode scanner for RT1740 |
| 3 | High-gain antenna |
| 12 | Nickel-metal-hydride battery (2-hour charge time) |
| 6 | Battery charger |
| 1 | Nonpowered fork-truck terminal mounting bracket |
| 6 | Belt and carrying case |
| 1 | Native server software |

-continued

| Qty | Description |
| --- | --- |
| Other inventory system peripherals: | |
| 1 | US Robotics high-speed telephone modem |
| 3 | Hewlett-Packard LaserJet 4+ printer |
| 1 | Uninterruptible power supply w/shutdown software |
| 9 | Nematron industrial terminals (for fillers) |
| 1 | 8-port Ethernet ThinNet repeater |
| 15 | Tapes for backup |
|   | All line drivers, cables, and connectors required |
| Case detection stations at stackers: | |
| 54 | Photocells with termination boxes |
| 1 | AB SLC remote I/O adapter |
|   | PLC rack, power supply, I/O modules, enclosures, wireway, and other miscellaneous hardware |
| Conveyor gate controller: | |
| 1 | Allen-Bradley SLC 5/03 processor |
| 1 | Allen-Bradley Panelview 550 operator interface terminal |
|   | PLC rack, power supply, I/O modules, enclosure, relays, wireway, and other miscellaneous hardware |

Installation of conduit, power and communication cables, and 110VAC service for computers and peripherals is accomplished.

The two disk drives mirror each other. If one fails, the other automatically takes over.

A dedicated telephone line is available to the computer. This line is used to perform remote diagnostics and provide software support. This telephone line runs directly between the computer and the telephone company, bypassing any switchboards.

OPERATING SYSTEM AND DATABASE OVERVIEW

The computer system is delivered as a turnkey system. No knowledge of the operating system or programming language is required to operate the system.

The preferred operating system is HP-UX, and is purchased from Hewlett-Packard. Also included is TCP/IP and NFS networking software.

The database and application development system is Progress, and is purchased from Progress Software Corporation.

Preferably the programs are written in the fourth-generation programming language that is supplied with Progress. A portion of the S/R machine and conveyor communication system is written in C. A C compiler is included with the system.

The software architecture is a mixture of host-based and client-server computing. At the center is the Hewlett-Packard Unix server. The client PCs are connected to the server via an Ethernet network, and operate as remote clients. The radio data terminals are also connected to the server via the Ethernet network, using the Ethernet-based base radios, but operate as local clients. The industrial terminals at the fillers also operate as local clients.

SOFTWARE APPEARANCE AND OPERATION

The appearance of the screens is consistent throughout the application. Data entry and display preferably use the Microsoft Windows 95 graphical user interface on PCs, consistent with commonly-used Windows operational standards. Consistent use is made of the video characteristics available on the PCs and terminals such as color, underlining, blinking, and intensity control. Prompt lines and error messages always appear in the same places and manner on the screen.

All application software, including system administration software, is menu-driven. No knowledge of Unix command level operation is necessary.

Consistent use of function keys and defaults keep operator keystrokes to a minimum.

STARTING THE SYSTEM

Figure 13:
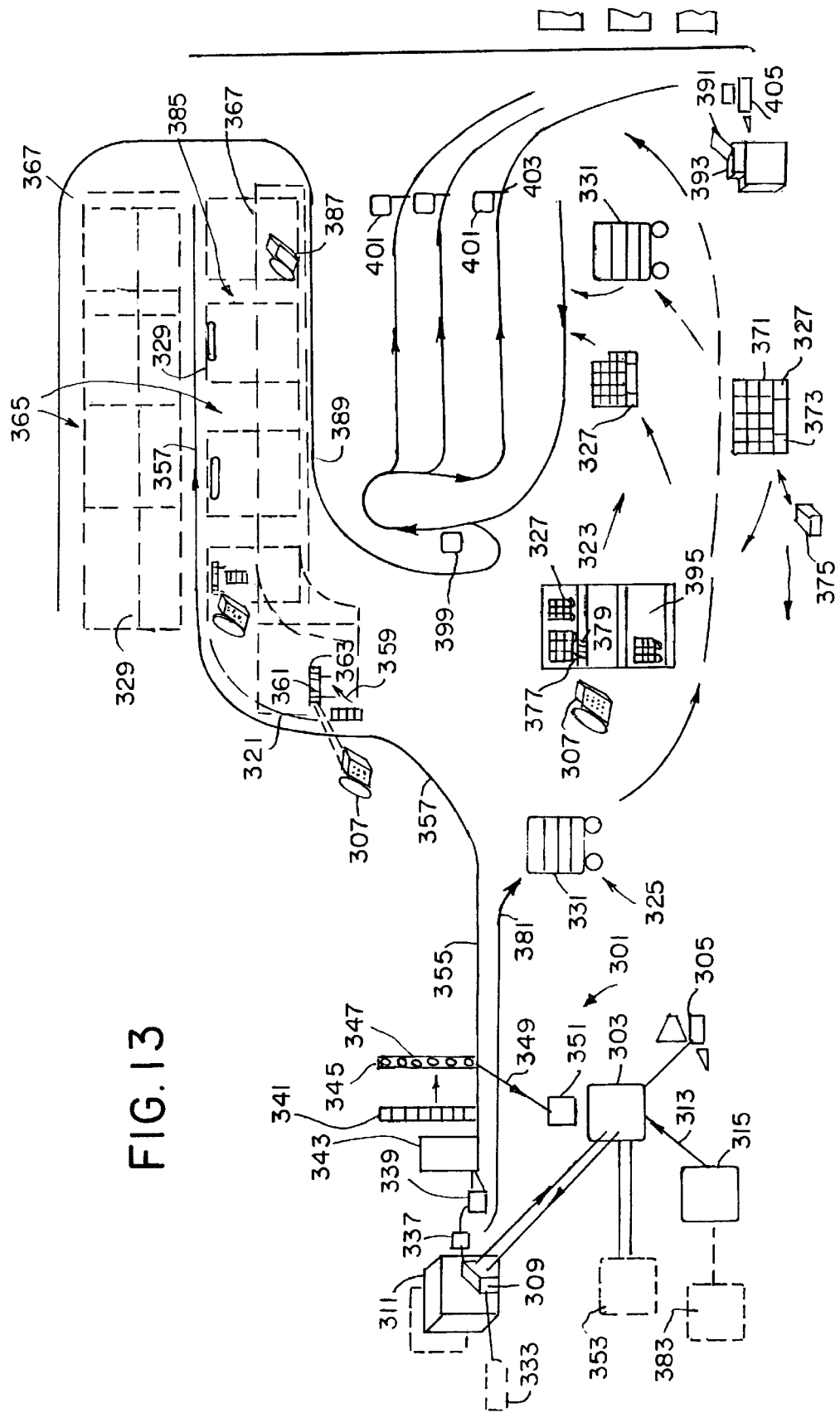
FIG. 13 is a schematic of a floor inventory system of the present automated storage facility.

A preferred embodiment of the present inventory management system is shown in FIG. 13. The system 301 can be configured to start automatically when the computer 303 is turned on. If the system shuts down abnormally, such as during a power failure, any partially-completed transactions are backed out automatically when the system restarts.

Once the system is started, users on PCs 305 can log in by double-clicking on the "Inventory Management System" icon. Users on radio terminals 307 or terminals 309 at the fillers 311 can log in by typing a system name at the Unix command-line prompt.

Logging in starts up the application at that PC or terminal, displaying a window where users type in their particular name and password before they have access to the main menu.

SECURITY

Security is enforced by password control while logging into the application.

An internal "user table" specifies the names of all users who can access the system. This table includes the names, passwords, and privileges of each user who is authorized to use the system. This table can be modified by the warehouse manager. Each application program can be turned "on" or "off" for individual users.

Passwords are encrypted within the database. Even if the encrypted passwords are discovered and displayed, they are of no value.

HOST COMMUNICATIONS

A thin-wire Ethernet network link 313 is included with the system. This link can connect the computer to a host computer (supplied by Owner). TCP/IP and NFS networking software is included with the system. The system can perform the following operations via the network:

1. Receive orders from the host computer.
2. Transmit shipments and inventory balances to the host computer.
3. Allow remote users to log into the system and operate the software as if they were using local terminals.

The file format for sending and receiving data will be agreed upon by the customer of the project.

If the network fails, data can be received and transmitted using 3.5" floppy disks.

SOFTWARE OVERVIEW

For the following software definition additional detail and customization will be developed, ensuring that the final product is complete and well-suited to operation.

SKU DEFINITION

Products are defined in the "SKU" (stock-keeping unit) table. This table contains the following minimum data per product:

SKU Code
UPC code
Description
Units/Case
Cases/Stack
Cases/Pallet
Units/Bossie
Shelf Life, in days
LIFO (Last-In, First-Out) Toleration, in days
List Of Permitted Fillers
Picking Zone SKU definitions can be created, modified, or deleted. SKUs cannot be deleted if there is any material of that type currently in inventory or on order.

INVENTORY DEFINITION

Inventory locations and contents are tracked in the floor picking area 321, the pallet rack area 323, and the bossie makeup area 325.

In the pallet rack 323, inventory is tracked by pallet 327. Each pallet has a location. Each pallet can contain multiple SKUs. Each SKU on a pallet has a SKU code, a quantity, and an expiration date.

In the floor picking area 321, inventory is tracked by location on the floor. The floor is divided up into storage zones 329, which can be of any size. Each storage zone can contain multiple SKUS. Each SKU in a zone has a zone code, a SKU code, a quantity, and an expiration date. Absolute location within a zone is not tracked, for convenience.

In the bossie makeup area 325, inventory is tracked by bossie 331. Each bossie has a SKU code and an expiration date. Absolute location within the bossie makeup area is not tracked, for convenience.

Inventory can be manually adjusted in any area, or can be manually moved from one area to another. Normally, such adjustments and movements are logged by radio unit 307 or automatically as products are received and picked.

RECEIVING PRODUCT FROM THE FILLERS

Each filler 311 is equipped with a sealed industrial terminal 309 which is connected to the Hewlett-Packard server 303. When a filler begins operation, or during a changeover, the filler operator enters the type of SKU and the expiration date code into the terminal. He can only choose from the approved SKUs 333 for that filler. For example, half-pints cannot be entered at a gallon filler. The computer suggests 335 an appropriate date code based on the type of SKU (current date plus the SKU's shelf life).

Filled products 337 are placed in cases 339, and the cases are stacked 341 six high by a stacker 343.

At the output of each stacker is a post 345 which contains six photocells 347. These photocells are connected 349 to a PLC (programmable logic controller) 351, which is in turn connected to the Hewlett-Packard server 303. Whenever a stack passes by the post 345, the PLC 351 detects the number of cases being produced, and sends a message 351 to the server which indicates the filler number and the number of cases. The server then creates a stack in inventory 353, based on the SKU being produced on that filler and the case quantity received from the PLC.

PULLING STACKS INTO STORAGE

The stacks move along roller conveyors 355 mounted in the floor. Configurations of the conveyors are called the floor loop 357.

After production, the stacks travel the floor loop 357 until pulled off 359 into storage by the pullers.

The storage zones 329 are identified by barcoded (and human-readable) labels 361 suspended from an overhead bar 363. The pullers decide in which storage zone 329 they wish to place each stack 341. When a stack is in position for storage, the puller pulls it off the conveyor and into the storage zone. He then identifies the product (by UPC code), case quantity, and storage zone using his terminal 307. The case quantity defaults to a full stack. The computer remembers the last several products, minimizing the need to scan each UPC code. The storage zone 329 is entered by scanning the barcode 361 on the overhead bar 363.

A group 365 of storage zones 329 is defined as a pick zone 367. Each SKU has a single defined pick zone. The computer verifies that the storage zone chosen is contained in the pick zone for that SKU. Additionally, the computer prohibits multiple expiration dates of the same SKU from sharing the same storage zone.

PALLET STORAGE

Some material 371 is received on pallets 373. When a pallet arrives, a receiving program 375 permits the pallet's material to be entered into inventory. A pallet may contain multiple SKUs, each having a quantity and expiration date. Each pallet position 377 in the rack 323 is identified with a barcoded (and human-readable) label 379. When a pallet is identified and stored, the receiver then scans the location label 379 to complete the transaction.

BOSSIE STORAGE

Some material is diverted 381 from the fillers 311 to a bossie makeup area 325. When a bossie 331 is made, a receiving program permits the bossie's material to be entered into inventory. Each bossie has a SKU, a quantity, and an expiration date. The RF-based bossie receiving program prompts for the UPC code, expiration date, and number of bossies (the default is one bossie). The computer suggests an appropriate date code based on the type of SKU (current date plus the SKU's shelf life).

ENTERING ORDERS

The system includes order-handling capabilities. Orders 383 can be received via the Ethernet connection, DOS-formatted floppy disks, or manual entry. The exact contents of orders are not known, and will be agreed upon during the design phase of the project.

Using the order editor program, orders can be created, modified, or deleted. Deletion of an order is preceded by a verification step. Orders can be scheduled and activated for picking. Orders can be unscheduled, if desired.

ORDER PICKING

Products are picked by pick zone 367. A pick zone is a path that an order picker walks while picking product. Each pick zone is a list of storage zones 329.

Multiple pick zones can be defined and modified. A pick zone may combine storage zones in multiple areas, such as the floor 385 and the pallet rack 323, if desired.

When an order picker begins picking, he tells the computer which pick zone he'll be working in. When orders are activated, the computer directs the order pickers along their pick zones, displaying the proper quantities for them to pick on their handheld RF data terminals 387.

Typically, an order-picking screen displays the following information:

Order number

SKU to pick

Quantity to pick (stacks/cases/units, or bossies)

Picking Location

The order-picking screen the prompts for the following information:

Quantity actually picked (stacks/cases/units, or bossies)

Actual Picking Location

All information is verified for suitability.

The computer knows the schedule of orders and each order picker's progress along the zone. After an order picker picks the desired quantities and places them on conveyor 389, he confirms the entry into the RF data terminal. The computer then directs him to the next pick location, and displays the next product and quantity to pick. If he picks the item short, he enters this into the RF data terminal. In any case, the computer immediately deducts the proper quantity from inventory and credits the order.

The computer minimizes the path that the order picker walks while picking. When an order picker begins picking an order, the computer locates all requests for the order which require product from that pick zone. It then searches for the storage zones of the oldest expiration date of each product, and sorts the final list by the picking path.

When the last item for an order has been picked, the computer automatically prints an Checker Report 391 on the printer 393 in the dock office.

PICKING FROM THE PALLET RACKS

Picking from the pallet racks 323 is done in a similar manner. The pallet positions 377, which can be picked from are assigned to a pick zone, and material which is picked is deducted from the pallet.

A "Move Pallet" transaction is supplied which facilitates moving a pallet from a storage position 377 in the pallet rack 23 to a picking position 395 or 397.

PICKING BOSSIES

Picking from the bossies is done in a similar manner. Instead of being prompted for stacks, cases, or units, however, the order picker is prompted for the number of bossies.

CHECKING AND SHIPPING ORDERS

Product which is picked passes by an order checker 399. The order checker is given a Checker Sheet 391 which lists all product for the order, grouped by pick zone. The order checker verifies that the quantities are correct, and then releases the product to the dock for loading onto the truck. The product is released via a PLC control screen 401 that is placed at the release gate 403. The order checker enters into this control screen the number of stacks to release. The PLC releases the specified number of stacks and then closes the gate, permitting the order checker to check another conveyor line while the stacks are traveling to the dock. The order checker determines the number of stacks to release by counting them as he checks them.

Palletized product 327 and bossies 331 also appear on the Checker Sheet, and can be checked at the order checker's convenience.

When all product for an order has been checked, the order checker steps into the dock office and uses one of the client PCs 405 to print a bill of lading.

ADJUSTMENTS TO INVENTORY

Adjustments to inventory can be entered at any client PC. That can be necessary when receiving returns or after taking a physical inventory.

ADJUSTMENTS TO ORDERS

Adjustments to orders can be entered at any client PC. That can be necessary when last-minute changes to orders are received. Inventory can be either added to an order or returned to stock.

Additions to an order can be received even while the order is being picked. The computer will, in real time, even direct an order picker to move backward along the pick zone to retrieve newly-requested material.

If an addition to an order is received after an order is picked, however, the order must be rescheduled.

HISTORICAL TRACKING

The system maintains the following historical information:

1. Receipts.
2. Adjustments to inventory.
3. Orders and shipments.
4. Order picking information.
5. Alarms.

Each of these is maintained for up to 400 days.

REPORTS

A variety of reports are included with the system. All reports can be directed to either the user's screen or a printer. Reports can be scheduled to run automatically at specified times and days of the week. The reports include:

Maintenance reports:
　SKU Definitions
　Storage Zones
　Pick Zones
Current inventory reports:
Inventory Summary
Inventory By Location
Pallets By Product
Expired Inventory
Mixed Storage Zones
Mixed Pallets
Expected Shortages
Historical reports:
　SKU Movement
　Picking Activity By Zone
　Picking Activity By Order
　Shipments
　Receipts
　Daily Case Summary
　Alarms

SYSTEM ADMINISTRATION

The system contains utilities for performing the following functions:

1. Starting up and shutting down the entire application, or individual programs within it.
2. Backing up the database to tape.
3. Restoring the database from tape.
4. Scheduling daily database backups to occur at a specified time. The system supports on-line backups of the database, permitting full 24-hour operation of the warehouse.
5. Accessing the database performance/resource monitor.
6. Monitoring the overall system performance.

These utilities are menu-driven, requiring no knowledge of the operating system.

Remaining system administration tasks are performed directly through the computer's operating system, using the programs supplied by the computer vendor.

While the invention has been described with reference to specific embodiments, modifications and variations of the invention may be constructed without departing from the scope of the invention.

We claim:

1. An automated storage and retrieval method comprising providing stacks of pallets proximate pallet loaders, delivering stacks of cases of a single product via infeed conveyors to the pallet loaders, pushing individual stacks from the stacks of cases onto the pallets from the stacks of pallets until the pallets are full, releasing the pallets down infeed lanes, picking the pallets from ends of the infeed lanes, carrying the pallets to storage racks using cranes, placing the pallets in the storage racks, instructing the cranes to retrieve the pallets, retrieving the pallets from the storage racks, delivering the pallets to outfeed lanes, directing the pallets to ends of the outfeed lanes proximate pallet unloaders, pushing the stacks of cases on the pallets onto floor conveyors, directing the empty pallets to empty pallet lanes, and returning the empty pallets to the stacks of pallets proximate the pallet loaders.

2. The method of claim 1, further comprising stacking empty pallets in the empty pallet lanes, delivering the empty pallets to receiving platforms of pallet washers, and washing the pallets.

3. The method of claim 1, wherein carrying the pallets to storage racks using cranes further comprises continually loading ground level storage racks, and further comprising order picking stacks of product directly from the ground level storage racks, placing the stacks of product on order picking outfeed conveyors, delivering the stacks via the order picking outfeed conveyors to a truckload assembly area, and directing empty pallets to the empty pallet lanes.

4. The method of claim 1, wherein delivering stacks of cases of a single product via infeed conveyors to the pallet loaders further comprises arranging groups of sixteen stacks of six loaded cases each, and wherein pushing individual stacks from the stacks of cases onto pallets from the stacks of pallets until the pallets are full further comprises loading each pallet with one group of sixteen stacks of six loaded cases.

5. The method of claim 1, wherein the pallets are loaded, stored, retrieved and emptied in pairs, wherein product on paired pallets are identical and wherein the paired pallets are placed in adjacent storage racks side-by-side.

6. A storage and retrieval facility comprising multiple storage centers separated from adjacent storage centers on one side by an aisle and on another side by an order picking lane, wherein each storage center further comprises multiple rows and multiple columns of storage racks, with a majority of the racks of at least a bottom row sloping downward from a side closest to the aisle to a side closest to the order picking lane and a minority of the racks of at least a bottom row sloping downward from a side closest to the order picking lane to a side closest to the aisle, order picking conveyors positioned in the order picking lanes for carrying product out of the order picking lanes, generally horizontally-extending tracks positioned in the aisles, cranes positioned in the tracks for traveling along the tracks, elevators provided on the crane for traveling vertically along masts of the cranes, cars mounted on the elevators for moving into and out of the racks, infeed conveyors having first ends positioned at supply areas and second ends terminating at pallet loading areas, pallet loaders provided at the pallet loading areas for loading stacks of product onto pallets, pallet infeed lanes extending between the pallet loading areas and the aisles, with the pallet infeed lanes sloping downward from the pallet loading areas to the aisles, an outfeed conveyor, pallet outfeed lanes extending between the aisles and the outfeed conveyor, with the pallet outfeed lanes sloping downward from the aisles to the outfeed conveyor, pallet unloaders positioned at areas where the pallet outfeed lanes meet the outfeed conveyor for pushing stacks of product from pallets onto the conveyor, and a computer digitally connected to the elevators, cars, cranes and pallet loaders and pallet unloaders for controlling activities.

7. The facility of claim 6, further comprising pallet washers, pallet return lanes extending between the aisles and the pallet washers, with the pallet return lanes sloping downward between the aisles and the pallet washers, and washed pallet lanes extending between exits of pallet washers and pallet loading areas, wherein the washed pallet lanes slope downward from the pallet washers to the pallet loading areas.

8. A product handling process comprising accumulating a batch of material, palletizing the batch of material on pallets, storing pallets in pairs, retrieving pairs of pallets to a location selected from the group consisting of a depalletizer, adjacent like assigned outfeed lanes, a single assigned outfeed lane and a pair of adjacent outfeed lanes assigned to an order, and recycling empty pallet stacks.

9. The process of claim 8, wherein accumulating the batch of material further comprises collecting batches of product and releasing the batch onto the conveyor which leads to a palletizer, wherein releasing the batch onto the conveyor further comprises determining if the batch constitutes two full pallets of product, releasing the batch to the conveyor if the batch is determined to constitute two full pallets of product, and waiting for manual batch release (end of run) and releasing a partial batch to the conveyor if it is determined that the batch does not constitute two pallets of product.

10. The process of claim 8, wherein palletizing the batch of material further comprises creating a pair of pallets from the batch and releasing the pallets to a storage/retrieval machine, wherein creating a pair of pallets further comprises receiving the batch from a first infeed conveyor, palletizing a first pallet, releasing the first pallet to the storage/retrieval machine, pointing the palletizer to a second infeed conveyor, determining if the batch includes additional nonpalletized material, palletizing the additional material on a second pallet, releasing the second pallet to the storage/retrieval machine, and pointing the palletizer to the first infeed conveyor.

11. The process of claim 8, wherein storing the pair of pallets further comprises picking up a pair of like pallets simultaneously at adjacent infeed addresses and depositing the pair of like pallets in storage areas, wherein depositing the pair of like pallets further comprises (a) determining if the pallets are suitable for delivery directly to outfeed lanes and depositing the pallets in the outfeed lanes, (b) if the pallets have not been deposited pursuant to step (a), determining if the product on the pallets should be stored in adjacent pairs of storage lanes and depositing the pallets in adjacent pairs of storage lanes, (c) if the pallets have not be deposited pursuant to steps (a) or (b), determining if the pallets can be delivered to a single storage lane having room for both pallets and already containing at least one pallet of identical product and depositing the pallets consecutively at the single storage lane, (d) if the pallets have not be deposited pursuant to steps (a), (b) or (c), determining if the pallets can be delivered to an empty storage lane and depositing the pallets consecutively at the empty storage lane, (e) if the pallets have not be deposited pursuant to steps (a), (b), (c) or (d), determining if any room is available and depositing the pallets at one or two storage lanes, and (f) if the pallets have not be deposited pursuant to steps (a), (b), (c), (d) or (e), sounding an alarm.

12. The process of claim 11, wherein determining if the pallets are suitable for delivery directly to outfeed lanes further comprises (i) determining if the pallets can be delivered directly to the depalletizer and depositing the pallets simultaneously at the adjacent pair of depalletizer outfeed lanes, (ii) if the pallets have not been deposited pursuant to step (i), determining if the pallets can be delivered directly to a pair of adjacent outfeed lanes which are assigned to the product and depositing the pallets simultaneously at the adjacent pair of outfeed lanes, (iii) if the pallets have not been deposited pursuant to steps (i) or (ii), determining if the pallets can be delivered directly to a single outfeed lane which is assigned to the product and has room for both pallets and depositing the pallets consecutively at the outfeed lane, and (iv) if the pallets have not been deposited pursuant to steps (i), (ii) or (iii), determining if the pallets can be delivered directly to a pair of adjacent outfeed lanes to satisfy a particular order which specifies the product and depositing the pallets simultaneously at the adjacent pair of outfeed lanes.

13. The process of claim 11, wherein determining if the product on the pallets should be stored in adjacent pairs of storage lanes further comprises (i) determining if the pallets can be delivered to an adjacent pair of storage lanes which already contain at least one pallet of the product and depositing the pallets simultaneously at the adjacent pair of storage lanes, and (ii) if the pallets have not been deposited pursuant to step (i), determining if the pallets can be delivered to an adjacent pair of storage lanes which are empty and depositing the pallets simultaneously at the adjacent pair of empty storage lanes.

14. The process of claim 8, wherein the location for retrieving a pair of pallets is the depalletizer, and wherein retrieving the pair of pallets further comprises determining a product required at the depalletizer and (a) determining if a pair of oldest suitable pallets of product can be found from a pair of adjacent storage lanes, picking the pallets simultaneously at the pair of adjacent storage lanes, and depositing the pallets simultaneously at a pair of adjacent depalletizer outfeed lanes, (b) if the pallets are not deposited pursuant to step (a), determining if a pair of oldest suitable pallets of product can be found in a single storage lane, picking the pallets consecutively at the storage lane, and depositing the pallets simultaneously at the pair of adjacent depalletizer outfeed lanes, (c) if the pallets are not deposited pursuant to steps (a) or (b), determining if a pair of the oldest suitable pallets of product can be found in two separate storage lanes, picking a first pallet at the first storage lane, picking a second pallet at the second storage lane, and depositing the pallets simultaneously at the pair of adjacent depalletizer outfeed lanes, (d) if the pallets are not deposited pursuant to steps (a), (b) or (c), determining if one of the oldest suitable pallets of product can be found in a single storage lane, picking the pallet at the storage lane, and depositing the pallet at one of the depalletizer outfeed lanes, and (e) if no pallet has been deposited pursuant to steps (a), (b), (c), or (d), sounding an alarm.

15. The process of claim 8, wherein the location for retrieving a pair of pallets is the adjacent like assigned outfeed lanes, and wherein retrieving the pair of pallets further comprises determining a product assigned to the adjacent outfeed lanes and (a) determining if a pair of oldest suitable pallets of product can be found from a pair of adjacent storage lanes, picking the pallets simultaneously at the pair of adjacent storage lanes, and depositing the pallets simultaneously at a pair of adjacent outfeed lanes, (b) if the pallets are not deposited pursuant to step (a), determining if a pair of oldest suitable pallets of product can be found in a single storage lane, picking the pallets consecutively at the storage lane, and depositing the pallets simultaneously at the pair of adjacent outfeed lanes, (c) if the pallets are not deposited pursuant to steps (a) or (b), determining if a pair of the oldest suitable pallets of product can be found in two separate storage lanes, picking a first pallet at the first storage lane, picking a second pallet at the second storage lane, and depositing the pallets simultaneously at the pair of adjacent outfeed lanes, (d) if the pallets are not deposited pursuant to steps (a), (b) or (c), determining if one of the oldest suitable pallets of product can be found in a single storage lane, picking the pallet at the storage lane, and depositing the pallet at one of the adjacent outfeed lanes, and (e) if no pallet has been deposited pursuant to steps (a), (b), (c), or (d), sounding an alarm.

16. The process of claim 8, wherein the location for retrieving a pair of pallets is the single assigned outfeed lane, and wherein retrieving the pair of pallets further comprises determining a product assigned to the single outfeed lane, (i) determining if there is room for at least two pallets in the outfeed lane and (a) determining if a pair of oldest suitable pallets of product can be found from a pair of adjacent storage lanes, picking the pallets simultaneously at the pair of adjacent storage lanes, and depositing the pallets consecutively at the outfeed lane, (b) if the pallets are not deposited pursuant to step (a), determining if a pair of oldest suitable pallets of product can be found in a single storage lane, picking the pallets consecutively at the storage lane, and depositing the pallets consecutively at the outfeed lane, (c) if the pallets are not deposited pursuant to steps (a) or (b), determining if a pair of the oldest suitable pallets of product can be found in two separate storage lanes, picking a first pallet at the first storage lane, picking a second pallet at the second storage lane, and depositing the pallets consecutively at the outfeed lane, (d) if the pallets are not deposited pursuant to steps (a), (b) or (c), determining if one of the oldest suitable pallets of product can be found in a single storage lane, picking the pallet at the storage lane, and depositing the pallet at the outfeed lane, and (e) if no pallet has been deposited pursuant to steps (a), (b), (c), or (d), sounding an alarm, and (ii) if there is no room for at least two pallets pursuant to step (i), determining the oldest suitable pallets of product that can be found in a single storage lane, picking the pallet at the storage lane, and depositing the pallet in the outfeed lane.

17. The process of claim 8, wherein the location for retrieving a pair of pallets is the adjacent outfeed lanes assigned to an order, and wherein retrieving the pair of pallets further comprises determining a least full pair of outfeed lanes assigned to the order, determining a next kind of product required to satisfy a separate order, and determining if at least two more pallets of product are required, and wherein (i) if two more pallets are required, (a) determining if a pair of oldest suitable pallets of product can be found from a pair of adjacent storage lanes, picking the pallets simultaneously at the pair of adjacent storage lanes, and depositing the pallets simultaneously at the pair of adjacent outfeed lanes, (b) if the pallets are not deposited pursuant to step (a), determining if a pair of oldest suitable pallets of product can be found in a single storage lane, picking the pallets consecutively at the storage lane, and depositing the pallets simultaneously at the pair of adjacent outfeed lanes, (c) if the pallets are not deposited pursuant to steps (a) or (b), determining if a pair of the oldest suitable pallets of product can be found in two separate storage lanes, picking a first pallet at the first storage lane, picking a second pallet at the second storage lane, and depositing the pallets simultaneously at the outfeed lane, (d) if the pallets are not deposited pursuant to steps (a), (b) or (c), sounding an alarm, and (ii) if two more pallets are not required, determining if a first pallet of next required product can be found in a storage lane, picking up the first pallet at the storage lane, and (aa) determining if a second pallet is required for the order, determining if the second pallet can be found in a storage lane, picking the second pallet at the storage lane, and depositing the first and second pallets simultaneously at the pair of adjacent outfeed lanes, (bb) if the second pallet is not required pursuant to (aa), depositing the first pallet at the least full of the pair of adjacent outfeed lanes, and (cc) if no pallets cane be found, sounding an alarm.

18. The process of claim 8, wherein recycling the empty pallet stacks further comprises picking a pair of empty pallet stacks from at least one return lane, and delivering the pair of empty pallet stacks to an area selected from the group consisting of a pallet washer and a palletizer, wherein delivering the empty pair of pallets further comprises (a) determining if two stacks can be picked up from a single return lane, finding a fullest return lane, determining if a return lane having at least two pallets is accessible, picking two pallets consecutively at the return lane, and deposit the two pallets simultaneously at the area, and (b) if two stacks cannot be picked from a single return lane pursuant to (a), finding a fullest return lane, picking a first pallet at the return lane, find a next fullest return lane, picking a second pallet at the return lane, and deposit the first and second pallets simultaneously at the area.

19. An automated storage and retrieval system comprising a multiple level storage center having a left storage section, a central storage section, a right storage section, multiple pallet receiving racks having pairs of c-shaped rails provided on each level of each section, longitudinal aisles separating the central section from the left section and the central section from the right section, lower longitudinal machine rails positioned along floors of the aisles, upper longitudinal machine rails positioned in the aisles above uppermost levels of the sections, stacker/receiver machines for travelling along the lower and upper machine rails, wherein each stacker/receiver machine further comprises masts having ends for riding along the upper and lower machine rails, a carriage positioned for movement up and down the masts, and a rack entry vehicle provided on the carriage for moving into and out of the storage racks, a first order picking lane provided at a second level of the right storage section on a side opposite that of the aisle, a second order picking lane provided at a second level of the left storage section on a side opposite that of the aisle, wherein pallet receiving racks on the second levels of the right and left sections have floors carrying the C-shaped rails that are inclined for sliding product downward and outward from the aisles to the order packing lanes, and a lowerator provided for vertical movement between levels of at least the right storage section for lowering stacks of empty pallets into positions for loading the pallets with bossie carts.

20. The system of claim 19, wherein the second level of the storage center further comprises infeed roller conveyors for delivering product to the second level, gates provided at an entry of the conveyor into the second level, product pushers provided at ends of the infeed conveyors inside of the storage center for pushing stacks of product onto pallets, inclined pallet lanes positioned between the pushers and pickup positions at ends of the aisles, outfeed conveyors positioned in the order picking lanes and extending to the lowerators, accumulators positioned along the order picking conveyors prior to the lowerator, gates provided after the accumulators for directing the product to appropriate paths along the conveyors, and lowerator pushers provided adjacent the lowerators for pushing the product onto the lowerators.

21. The system of claim 20, wherein the second level further comprises pallet return lanes extending between the order pick lanes and the aisles and sloped downward and inward toward the aisles, inclined empty pallet lanes positioned at the ends of the aisles near the product pushers and extending between the aisles and pallet stacking positions, and pallet pushers provided adjacent the pallet stacking positions for pushing pallets into pallet loading positions.

22. The system of claim 19, wherein the storage center further comprises a first level, wherein the lowerators travel between the first level and the second level, and wherein the second level further comprises bossie cart-pallet loading stations provided at openings of the lowerators, a pallet conveyor, bossie-pallet lanes sloping downward and inward from the bossie cart-pallet loading stations to the pallet conveyor, feed lanes positioned at far ends of the pallet conveyor for receiving bossie-laden pallets, with the feed lanes extending between the ends of the pallet conveyor and the aisles, outfeed lanes extending between the aisles and bossie removal stations, a bossie conveyor extending from the bossie removal stations to loading areas, and bossie pushers provided along the bossie conveyor for urging the bossies from the bossie conveyor.

23. A pallet for carrying wheeled carts comprising a plate having ends and sides, longitudinal side tubes extending along sides of the plate, cross tubes extending underneath the plate and between the side tubes, wheel holes provided along edges of the plate, wherein the holes have indented lips, longitudinal support tubes extending between the cross tubes along the openings, short support tubes extending along the wheel openings between the side tubes and the longitudinal support tubes, bracing tubes extending between the short support tubes and the cross tubes, and runners positioned on underside of the side tubes.

24. The pallet of claim 23, wherein the plate and tubes are made of aluminum.

25. The pallet of claim 23, wherein tube intersections are welded.

26. The pallet of claim 23, wherein the side tubes and the bracing tubes have generally rectangular cross-sections, and wherein the cross tubes, the short support tubes, and the longitudinal support tubes have generally square cross-sections.

27. The pallet of claim 23, wherein the cross tubes further comprise five spaced cross tubes, wherein a central cross tube has a generally rectangular cross-section, wherein remaining cross tubes have generally square cross-sections, wherein the side tubes and the bracing tubes have generally rectangular cross-sections, and wherein the short support tubes, and the longitudinal support tubes have generally square cross-sections.

28. The pallet of claim 23, wherein the plate has eight wheel holes.

29. A floor inventory management system for a storage facility comprising a server, an order station having at least one host terminal electronically connected to the server, a filler station having at least one first data input and retrieval terminal electronically connected to the server, a stacker for stacking product and a detector positioned at an exit of the station and connected to the server for determining a number of stacked product, a storage station having a floor picking area, a pallet rack area and a bossie makeup area, roller conveyors extending between the filler station and the floor picking area of the storage station for carrying stacks of product from the filler station to the storage station, second data input and retrieval terminals positioned in the floor picking area and electronically connected to the server, storage zones further comprising multiple pick zones provided adjacent the floor picking area, wherein each storage zone has at least one structure carrying barcoded labels and scanners connected to the second data input and retrieval terminals for scanning the barcoded labels, wherein the pallet rack area further comprises third data input and retrieval terminals electronically connected to the server, multiple storage racks, barcoded labels positioned proximate the racks for identifying pallets positioned in the racks, and scanners connected to the third data input and retrieval terminals for scanning the barcoded labels, wherein the bossie makeup area further comprises bossies having barcoded indicia, a diverter for diverting product from the roller conveyors to bossies, fourth data input and retrieval terminals electronically connected to the server and scanners connected to the fourth data input and retrieval terminals for scanning the barcoded indicia, outfeed conveyors extending from the storage zone for carrying products for shipment, order checking stations having fifth data input and retrieval terminals positioned along the outfeed conveyors, release gates positioned along the outfeed conveyors at exits, and programmable logic controllers positioned at the exits before the gates for controlling the gates.

30. The system of claim 29, wherein the detector further comprises an array of photocells and a programmable logic controller electronically positioned between the array of photocells and the server.

31. The system of claim 29, further comprising a docking station having a printer electronically connected to at least the fifth data input and retrieval terminals for printing reports.

32. The system of claim 29, wherein the terminals are selected from the group consisting of personal computers, handheld radio frequency data terminals and combinations thereof.

33. The system of claim 29, wherein thin-wire Ethernet network links connect the terminals to the server.

34. An inventory management method comprising providing a central server, providing an order station having host terminals electronically connected to the server, providing a filler station having first data input and retrieval terminals electronically connected to the server, providing a storage station having a floor picking area, a pallet rack area and a bossie makeup area, providing roller conveyors extending between the filler station and the floor picking area of the storage station for carrying stacks of product from the filler station to the storage station, providing second data input and retrieval terminals positioned in the floor picking area and electronically connected to the server, providing third data input and retrieval terminals in the pallet rack area and electronically connected to the server, providing fourth data input and retrieval terminals in the bossie makeup area and electronically connected to the server, providing outfeed conveyors extending from the storage zone for carrying products for shipment, providing order checking stations having fifth data input and retrieval terminals positioned along the outfeed conveyors, turning the server on, logging into the server through at least one of the terminals, identifying products by SKUs, entering SKUs and expiration date codes into the first data input and retrieval terminals, stacking the products, placing the stacks on the roller conveyors, detecting the stacks as the stacks exit the filler station using detectors, creating a stack in inventory using data from the first data terminals and the detectors, delivering the stacks to the floor picking areas via the conveyors, pulling the stacks off of the conveyor, identifying products included in the stacks and other information using the second data terminals, placing the stacks in pick zones of the storage areas, scanning barcoded labels identifying the storage zones in which the stacks were provided, verifying via the second data terminals that selected storage zones is contained in the pick zone for the product SKUs, identifying products included on pallets and other information using the third data terminals, positioning pallets in racks of the pallet rack area, scanning barcoded labels identifying the racks in which the pallets are stored, diverting product from the filler station to the bossie makeup area, identifying diverted products and other information using the fourth data terminals, positioning diverted products in the bossies, scanning barcoded labels identifying the bossies in which the pallets are stored, placing orders at the host terminals, picking ordered products from the storage zones, checking the products picked, delivering the checked products to shipment areas, and adjusting numbers of products in inventory through at least one of the terminals.

35. The method of claim 34, wherein logging into the server further comprises entering a password, encrypting the password, and comparing the password with a table of authorized passwords.

36. The method of claim 34, wherein detecting the stacks as the stacks exit the filler station further comprises passing the stacks in from to an array of photocells controlled by a controller, determining numbers of cases being produced and sending messages to the server indicating filler numbers and numbers of cases.

37. The method of claim 34, wherein verifying via second data terminals further comprises prohibiting multiple expiration dates for same SKUs from sharing same storage zones.

38. The method of claim 34, wherein placing orders at host terminals further comprises directing order pickers via the second, third and fourth data terminals along pick zones, picking the products, passing the picked products by the checking station, verifying the product picked with the product ordered, and releasing the product to a dock for shipment.

39. The method of claim 38, wherein directing order pickers further comprises displaying order numbers, SKUs to pick, quantity to pick and picking location and prompting for quantity actually picked and actual picking location.

40. The system of claim 38, wherein picking the products is selected from the group consisting of placing the products on outfeed conveyors, moving pallets of products, selecting bossies, and combinations thereof.

41. The method of claim 38, wherein releasing the product further comprises providing gates prior to the dock and controlling the opening and closing of the gates using a controller.

* * * * *